United States Patent
Galasso et al.

(10) Patent No.: US 9,385,515 B2
(45) Date of Patent: Jul. 5, 2016

(54) POKE-THRU FLOOR FITTING

(71) Applicant: The Wiremold Company, West Hartford, CT (US)

(72) Inventors: Marc Galasso, Beacon Falls, CT (US); Joseph A. Milheiro, West Hartford, CT (US)

(73) Assignee: The Wiremold Company, West Hartford, CT (US)

( * ) Notice: Subject to any disclaimer, the term of this patent is extended or adjusted under 35 U.S.C. 154(b) by 91 days.

(21) Appl. No.: 14/212,886

(22) Filed: Mar. 14, 2014

(65) Prior Publication Data
US 2016/0036211 A1    Feb. 4, 2016

Related U.S. Application Data

(60) Provisional application No. 61/794,203, filed on Mar. 15, 2013.

(51) Int. Cl.
*H02G 3/08* (2006.01)
*H02G 3/12* (2006.01)
*H02G 3/18* (2006.01)

(52) U.S. Cl.
CPC .................................... *H02G 3/185* (2013.01)

(58) Field of Classification Search
CPC ......... H02G 3/08; H02G 3/081; H02G 3/086; H02G 3/10; H02G 3/01; H02G 3/121; H02G 3/125; H02G 3/14; H02G 3/185; H02G 3/283; H05K 5/00; H05K 5/02; H05K 5/03; H05K 5/0247
USPC ......... 174/50, 53, 57, 58, 480, 481, 482, 483, 174/484, 486, 488, 489, 490, 495, 559; 220/3.2–3.9, 4.02; 52/220.1, 220.3, 52/220.8, 220.7

See application file for complete search history.

(56) References Cited

U.S. PATENT DOCUMENTS

| | | | | |
|---|---|---|---|---|
| 4,264,779 A * | 4/1981 | Rhodes et al. | ................. | 174/483 |
| 4,496,790 A * | 1/1985 | Spencer | ......................... | 174/484 |
| 5,237,128 A * | 8/1993 | Wuertz | ......................... | 174/483 |
| 7,183,503 B2 * | 2/2007 | Bowman et al. | .............. | 174/483 |
| 8,878,058 B2 * | 11/2014 | Wurms et al. | ................. | 174/483 |

* cited by examiner

*Primary Examiner* — Angel R Estrada
(74) *Attorney, Agent, or Firm* — McCormick, Paulding & Huber LLP

(57) ABSTRACT

A poke-thru floor system includes a poke-thru interface portion, a base and a cover. The poke-thru interface portion allows cable to pass through a floor structure. The base may be disposed on an upper surface of the floor structure and has an opening for communicating with the poke-thru interface portion. The cover interfaces with the base to form a longitudinal passage and is formed to be substantially the same shape as an upper surface of a cable raceway.

17 Claims, 13 Drawing Sheets

POKE-THRU FLOOR FITTING

CROSS REFERENCE TO RELATED APPLICATIONS

This application claims the benefit of the filing date of Provisional Application Ser. No. 61/794,203, filed Mar. 15, 2013, which is hereby incorporated by reference in its entirety.

FIELD OF THE INVENTION

This invention relates generally to power systems and, more particularly, to the distribution of electrical and data/telecommunication cables in buildings.

BACKGROUND

Buildings with open floor plans often include electrical and data/telecommunication distribution systems that include floor boxes and poke-thru devices. Poke-thru devices are placed into holes that have been formed in the was or flooring of the building to route electrical and data/telecommunication cables therethrough.

SUMMARY

The poke-thru devices provide access to data-ports, tele-ports and power sources and to allow for reconfiguration of desks and other office equipment having access to the poke-thru devices. Cable raceways are structures that also provide for the distribution of electrical and data/telecommunication wiring in buildings (e.g. office buildings, warehouses, stores and other similar facilities) by allowing the cabling to be distributed along the surfaces of floors and/or walls in buildings with the raceways.

In some applications, it may be desirable to route the electrical and data/telecommunication cables from one or more poke-thru devices to one or more cable raceways to further distribute the cables. However, routing cables from poke-thru devices formed through floor structures to raceways extending along said floor structures may become problematic because the structures transitioning the cables from the poke-thru devices to the cable raceways may pose tripping hazards if formed to be too large. Accordingly, it is desirous to provide an improved system for transitioning electrical and data/telecommunication cables from poke-thru devices to cable raceways to provide improved power and data/telecommunication cable distribution.

In an embodiment, a poke-thru floor system comprises a poke-thru interface portion, a base and a cover. The poke-thru interface portion allows cable to pass through a floor structure. The base may be disposed on an upper surface of the floor structure and has an opening for communicating with the poke-thru interface portion. The cover interfaces with the base to form a longitudinal passage and is formed to be substantially the same shape as an upper surface of a cable raceway.

These and other objects, features and advantages of the present invention will become apparent in light of the following description of non-limiting embodiments, with reference to the accompanying drawings.

DETAILED DESCRIPTION

Figure 1:
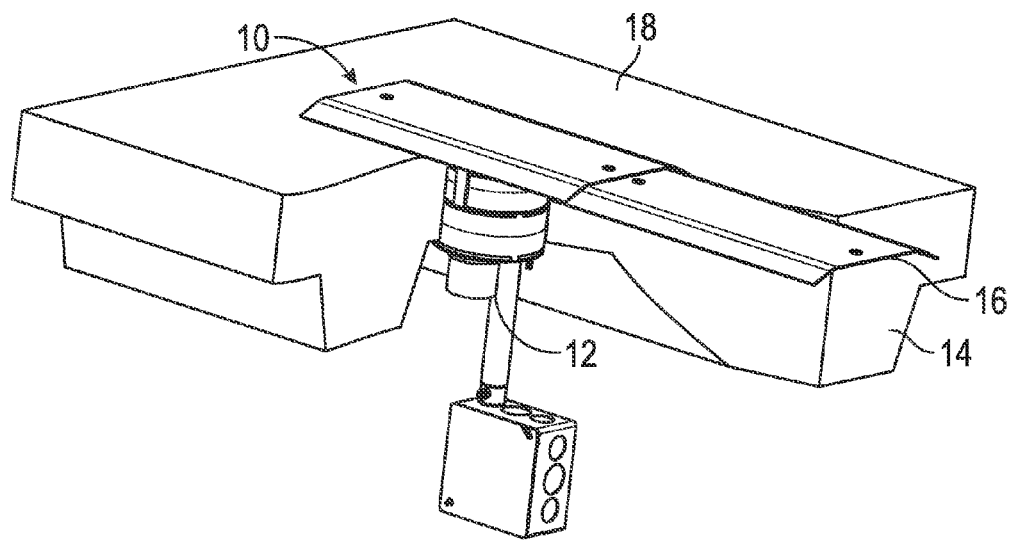
FIG. 1 is a perspective view of a poke-thru floor fitting system according to an embodiment.
Figure 2:
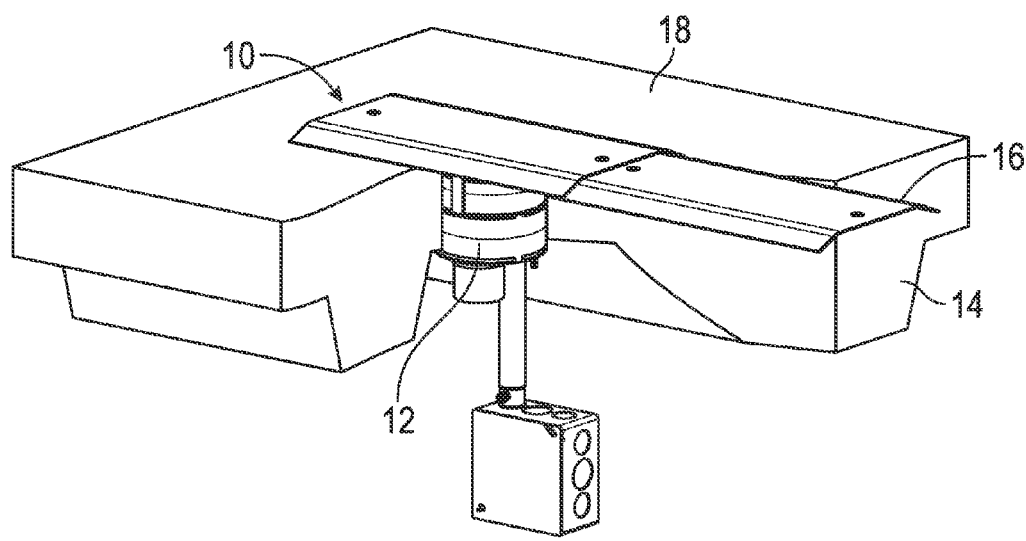
FIG. 2 is a perspective view of the poke-thru floor fitting system of FIG. 1.
Figure 3:
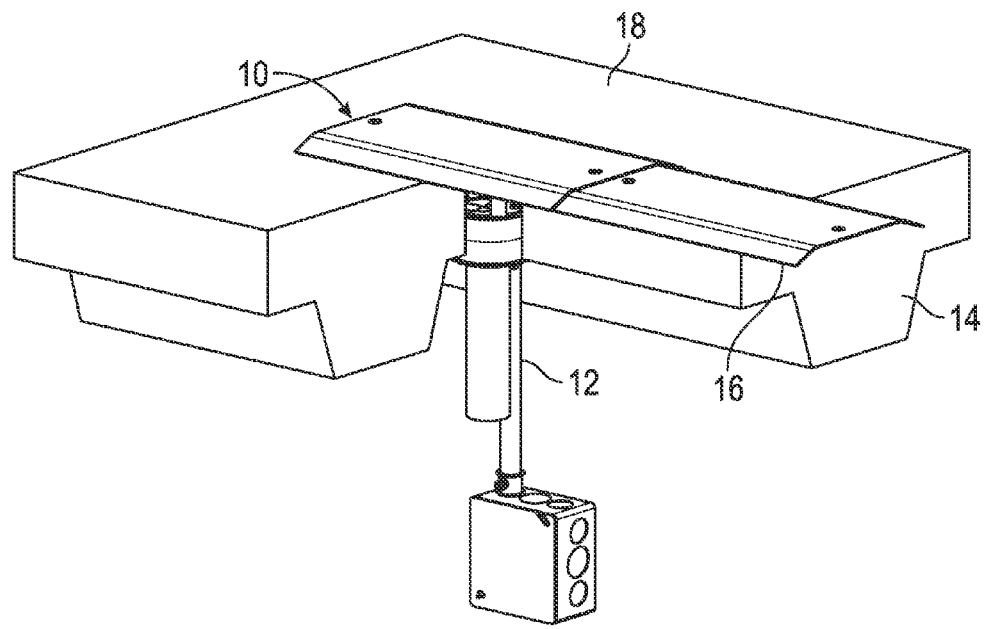
FIG. 3 is a perspective view of a poke-thru floor fitting system according to an embodiment.
Figure 4:
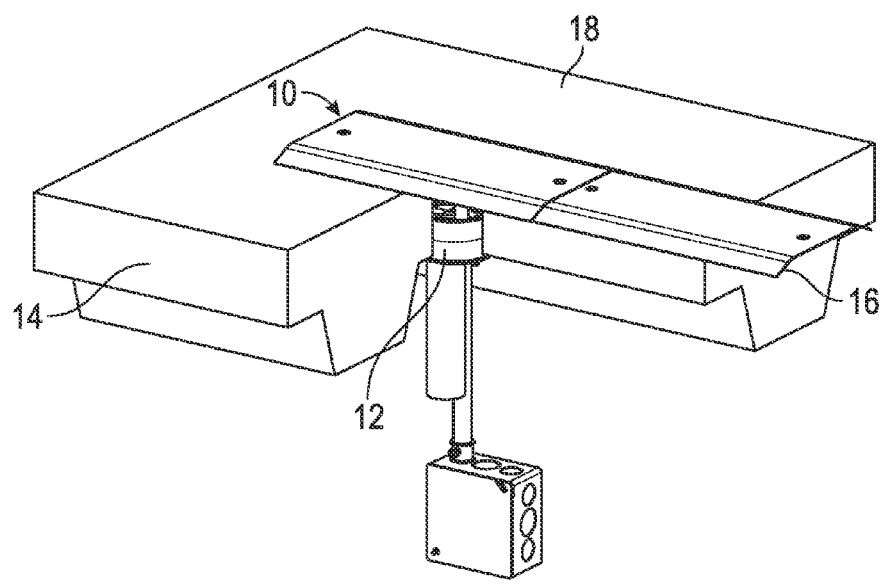
FIG. 4 is a perspective view of the poke-thru floor fitting system of FIG. 3.
Figure 5:
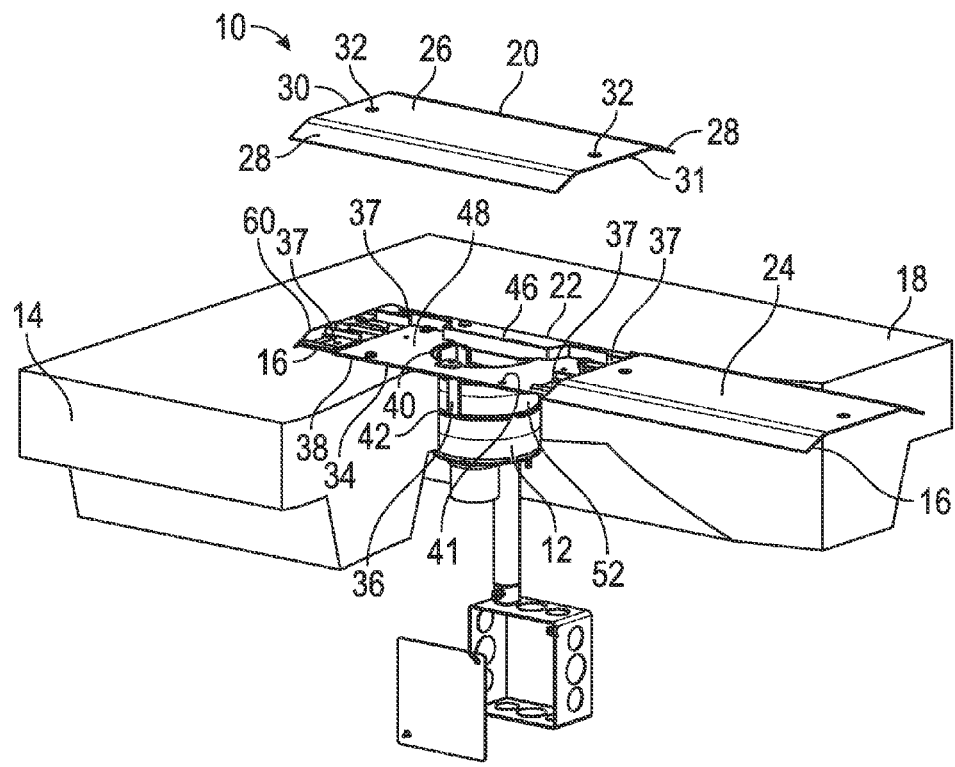
FIG. 5 is an exploded perspective view of the poke-thru floor fitting system of FIG. 1.
Figure 6:
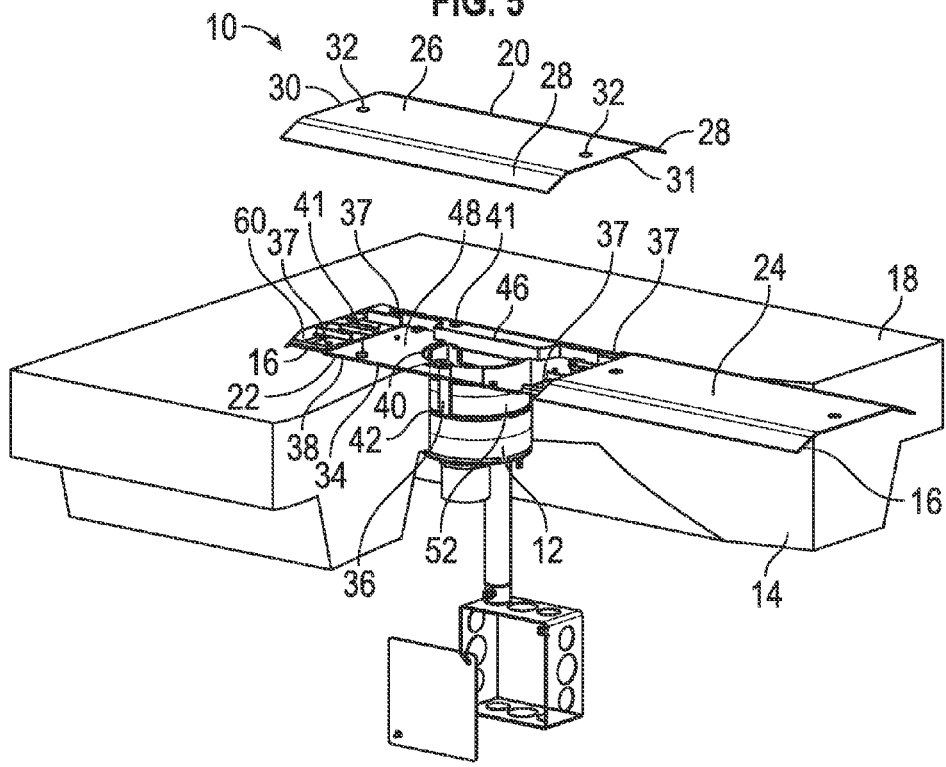
FIG. 6 is an exploded perspective view of the poke-thru floor fitting system of FIG. 2.
Figure 7:
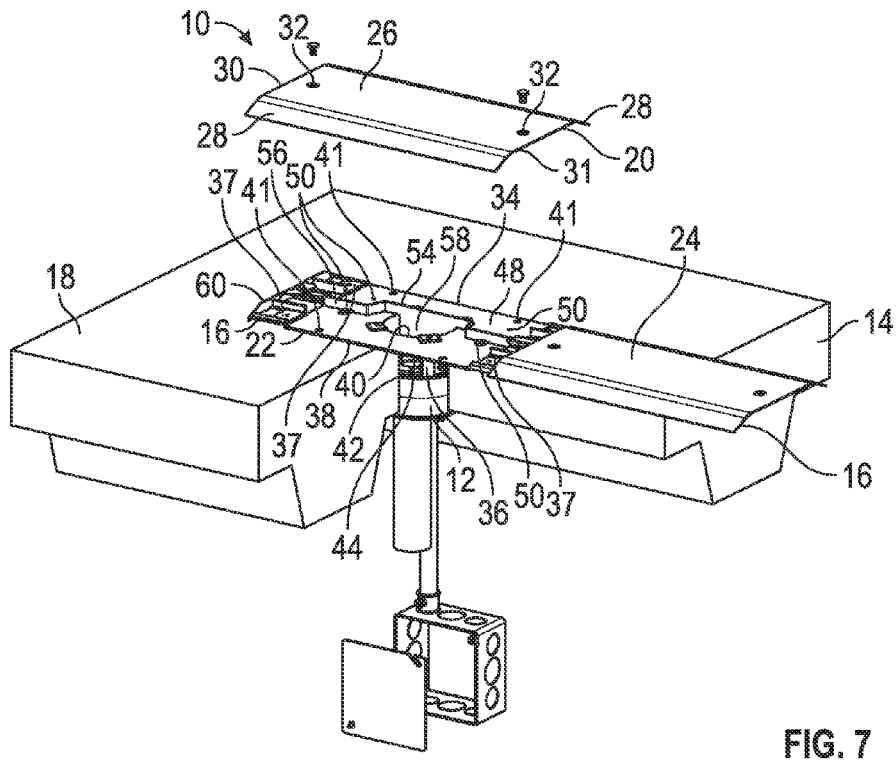
FIG. 7 is an exploded perspective view of the poke-thru floor fitting system of FIG. 3.
Figure 8:
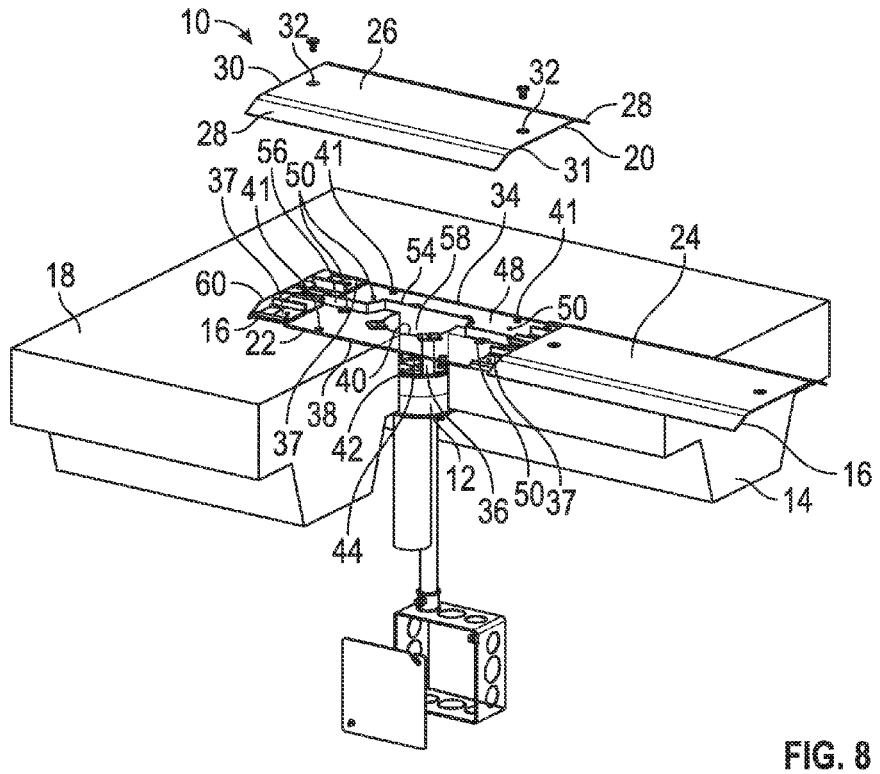
FIG. 8 is an exploded perspective view of the poke-thru floor fitting system of FIG. 4.

Referring to FIGS. 1-4, a poke-thru floor fitting system 10 for transitioning electrical and data/telecommunication cables (not shown) from a poke-thru device 12 passing through a floor structure 14 to a raceway 16 extending along an upper surface 18 of the floor structure 14 is shown. The poke-thru device 12 may be any of a variety of known poke-thru devices, such as standard 3-inch and 4-inch diameter poke-thru devices. The raceway 16 may be used to distribute the electrical and data/telecommunication cables (not shown) from the poke-thru device 12 across the upper surface 18 of the floor structure 14 and throughout a room to provide power and/or data/telecommunication outlets or ports to a variety of locations throughout the room, without obstructing traffic through the room.

Referring to FIGS. 5-8, the poke-thru floor fitting system 10 includes a cover 20 and a base 22. The cover 20 is formed to be substantially the same shape as an upper surface 24 of the cable raceway 16 and includes a flat top portion 26 with two angled side portions 28 that are angled downward from the planar surface of the flat top portion 26. The flat top portion 26 and the angled side portions 28 extend in a longitudinal direction from a first end 30 to a second end 31 of the cover 20. The cover may also include mounting holes 32 formed in the flat top portion 26 to facilitate connection of the cover 20 to the base 22 or to the raceway 16.

Figure 9:
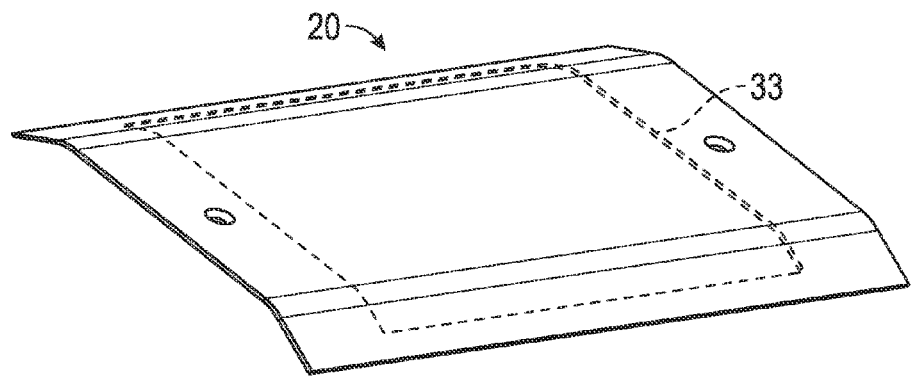
FIG. 9 is a bottom perspective view of a cover of the poke-thru floor fitting system of FIG. 5.
Figure 10:
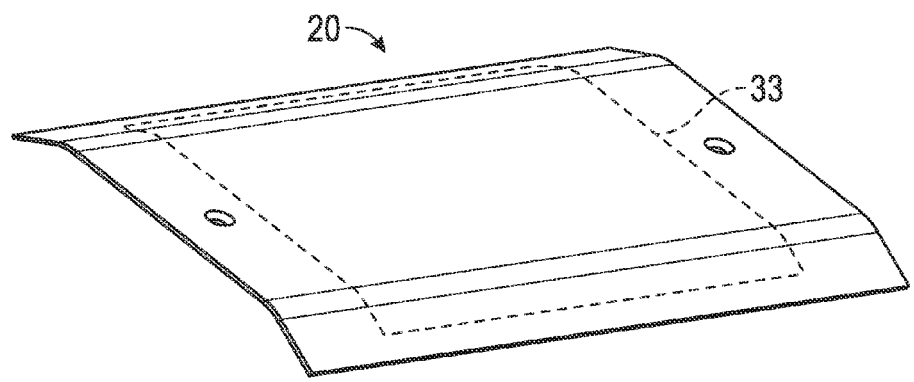
FIG. 10 is a bottom perspective view of the cover of FIG. 9.
Figure 11:
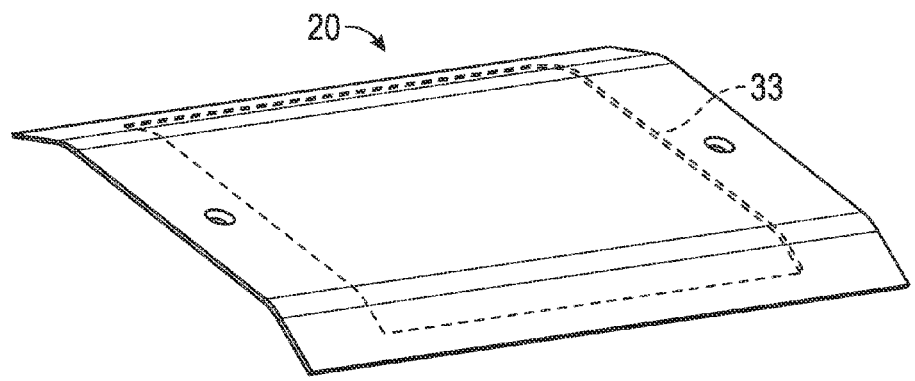
FIG. 11 is a bottom perspective view of a cover of the poke-thru floor fitting system of FIG. 7.

Referring to FIGS. 9-11, in some embodiments, the cover 20 may include a reinforcing portion 33 attached to an underside of the cover 20 to provide increased thickness to the cover 20 in an area of the poke-thru device 12, shown in FIGS. 5-8.

Figure 12:
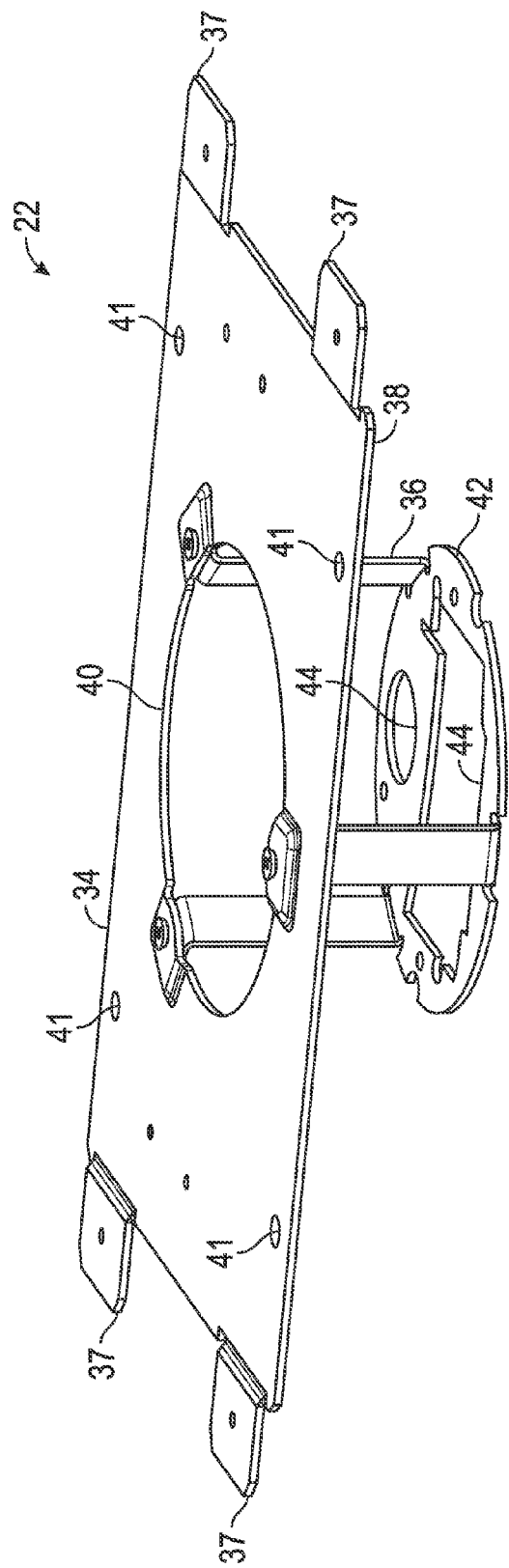
FIG. 12 is a top perspective view of a base of the poke-thru floor fitting system of FIG. 5.
Figure 13:
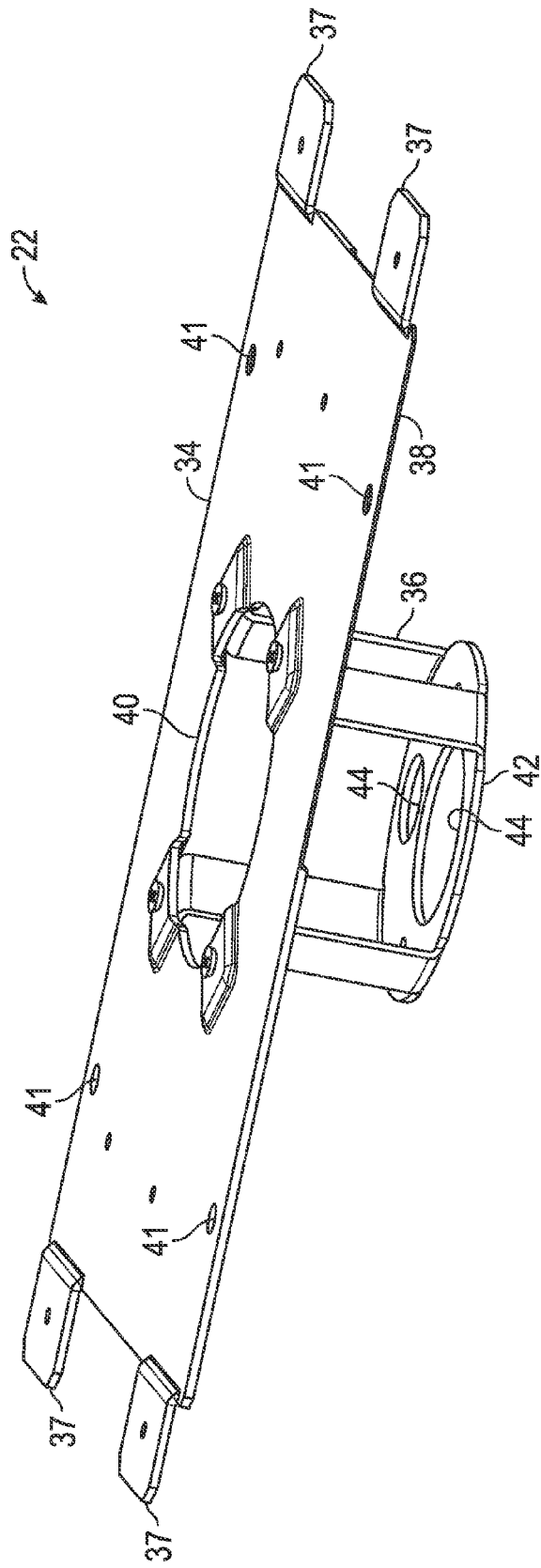
FIG. 13 is a top perspective view of a base of the poke-thru floor fitting system of FIG. 7.
Figure 14:
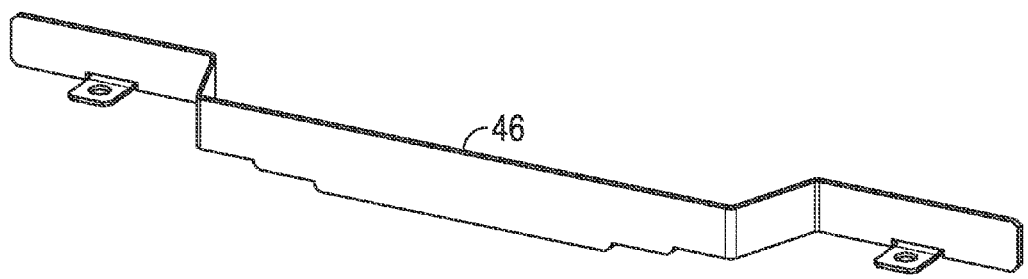
FIG. 14 is a perspective view of a divider of the poke-thru floor fitting system of FIG. 5.
Figure 15:
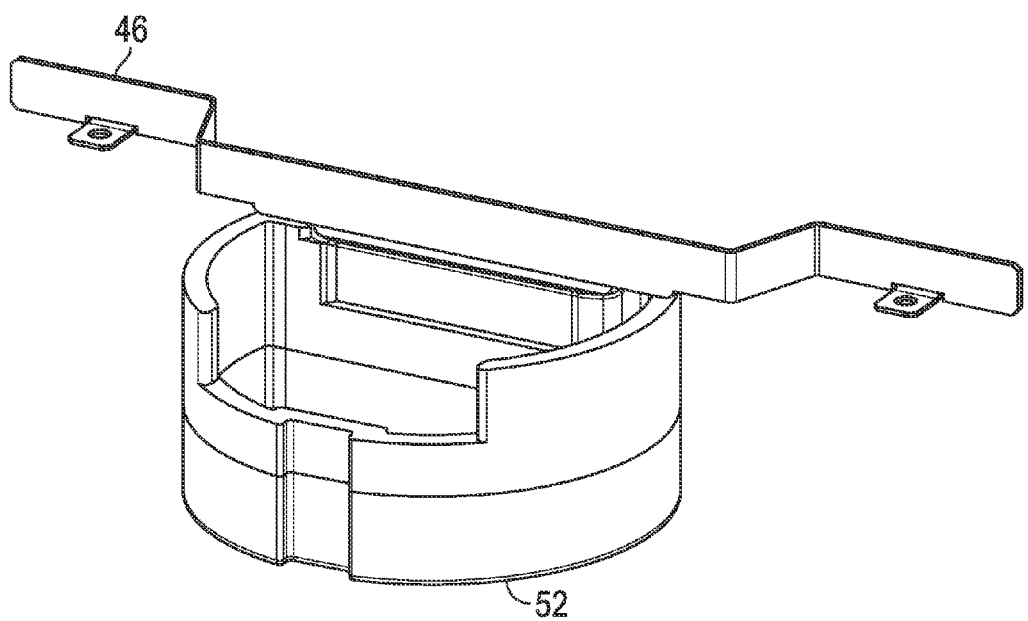
FIG. 15 is a perspective view of the divider and insert of the poke-thru floor fitting system of FIG. 5.
Figure 16:
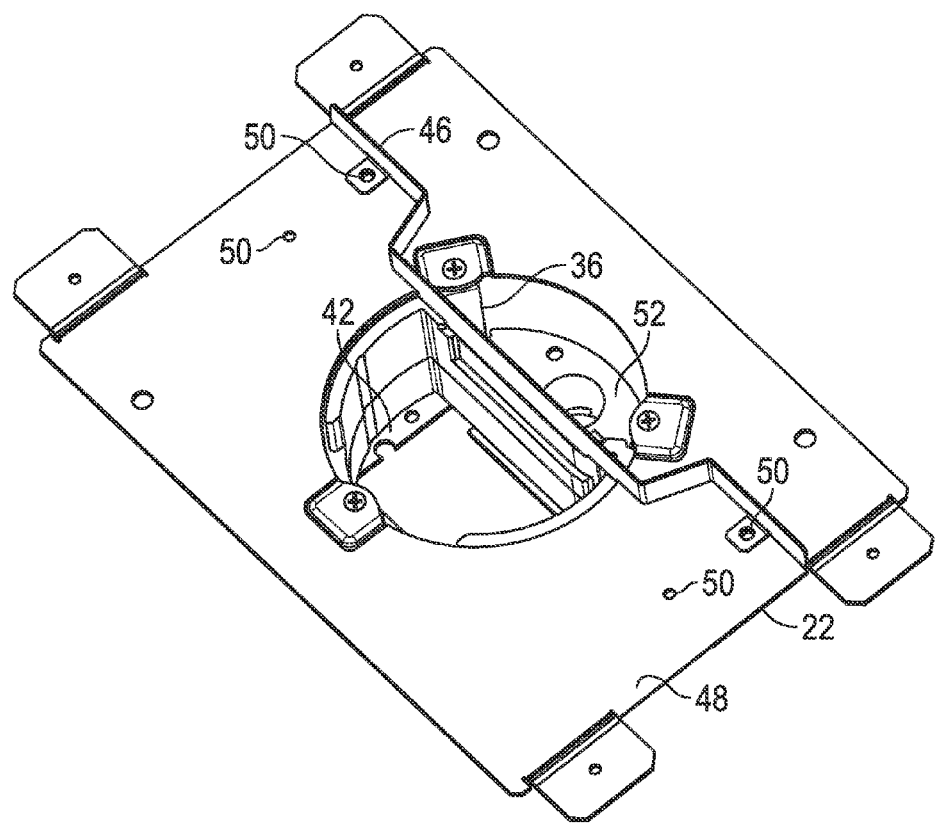
FIG. 16 is a top perspective view of the divider and insert positioned in the base of the poke-thru floor fitting system of FIG. 5.
Figure 17:
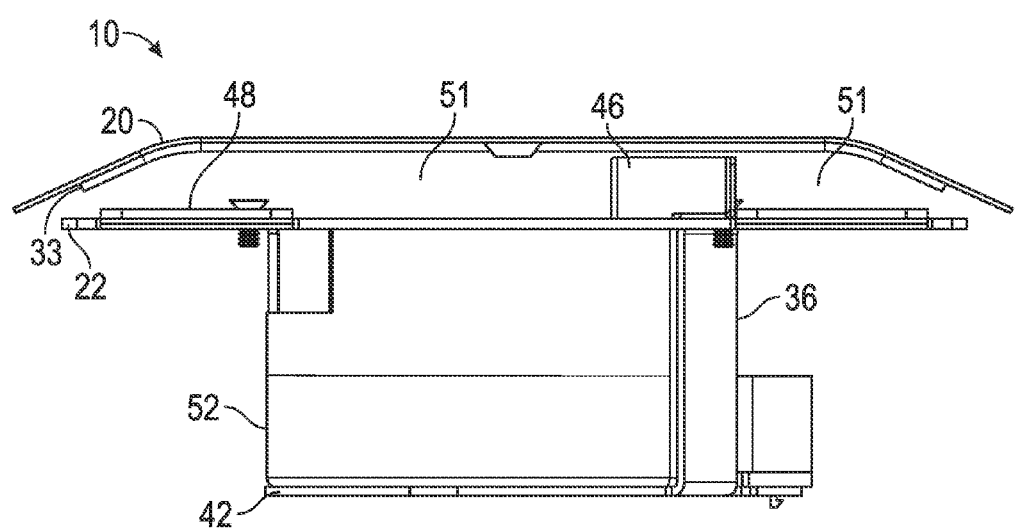
FIG. 17 is a side perspective view of the poke-thru floor fitting system of FIG. 5.
Figure 18:
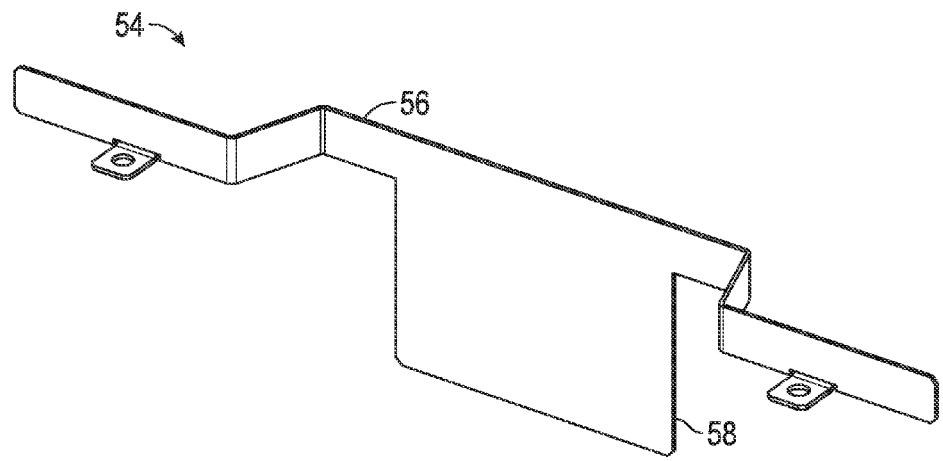
FIG. 18 is a perspective view of a divider of the poke-thru floor fitting system of FIG. 7.
Figure 19:
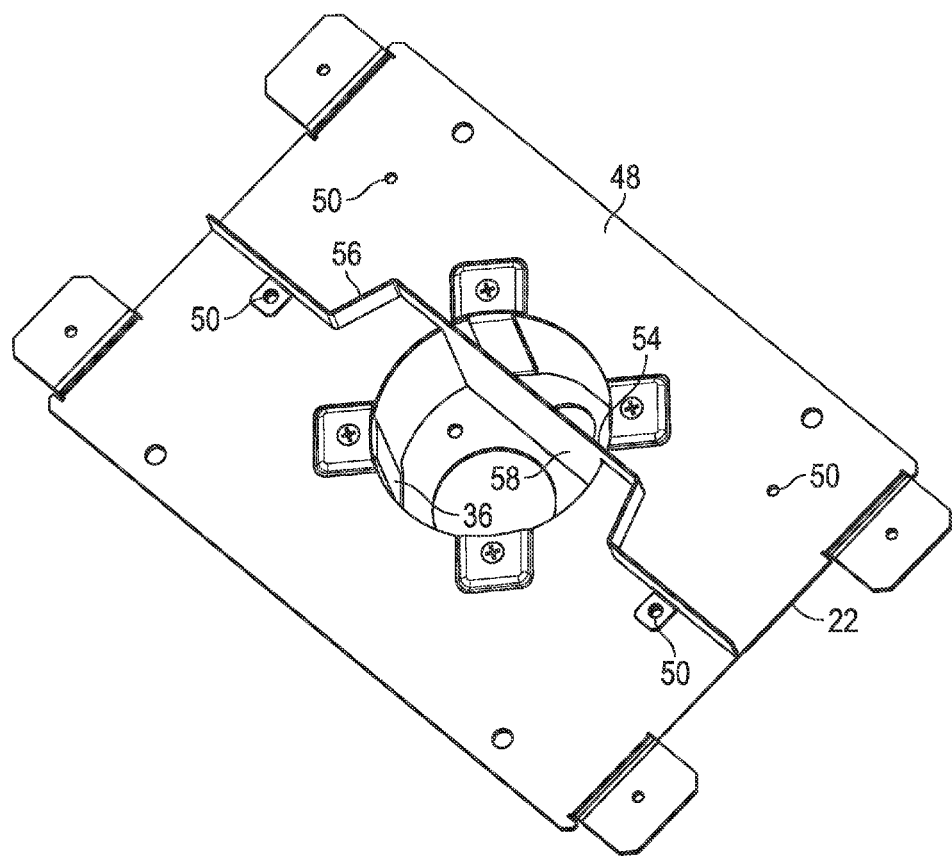
FIG. 19 is a top perspective view of the divider positioned in the base of the poke-thru floor fitting system of FIG. 7.
Figure 20:
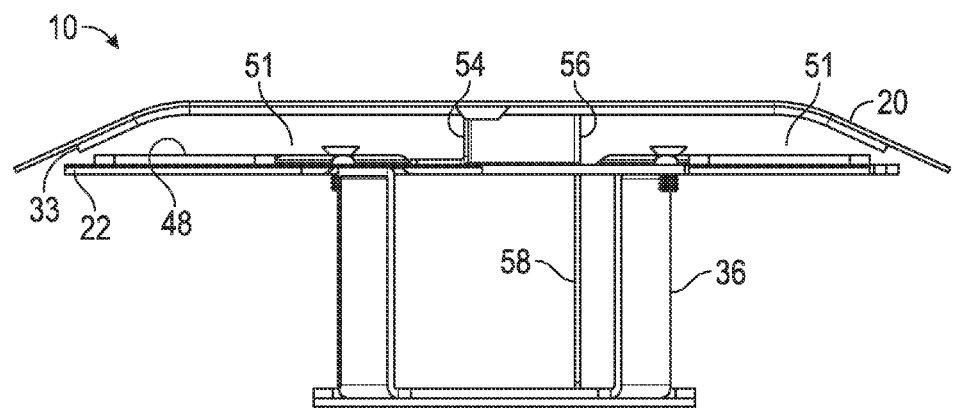
FIG. 20 is a side perspective view of the poke-thru floor fitting system of FIG. 7.
Figure 21:
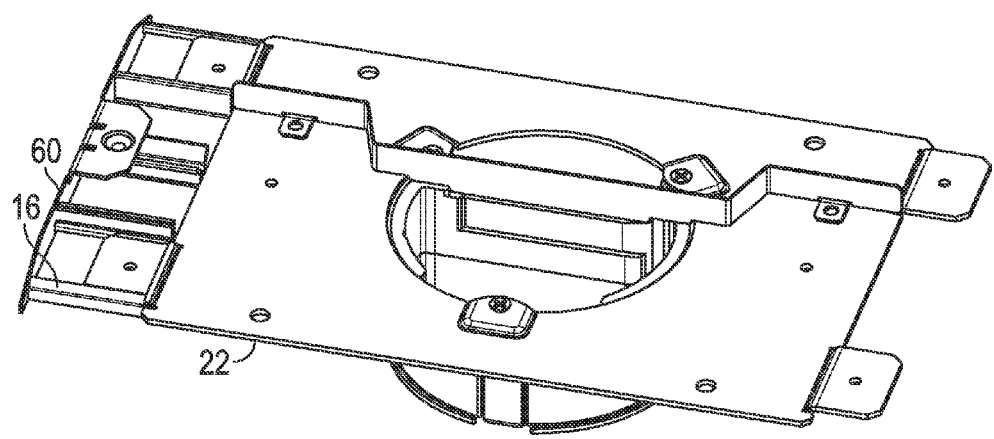
FIG. 21 is a front perspective view of a portion of the poke-thru floor fitting system of FIG. 5.
Figure 22:
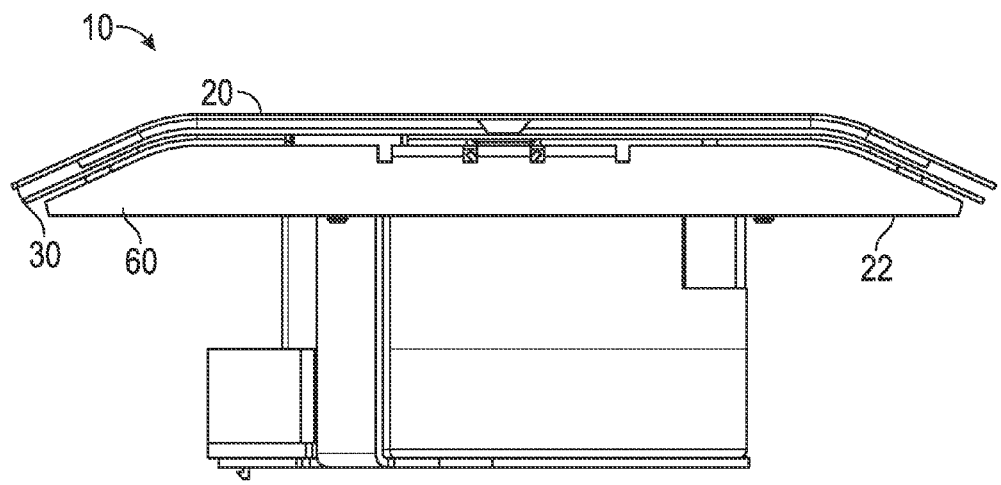
FIG. 22 is a side perspective view of the poke-thru floor fitting system of FIG. 5.
Figure 23:
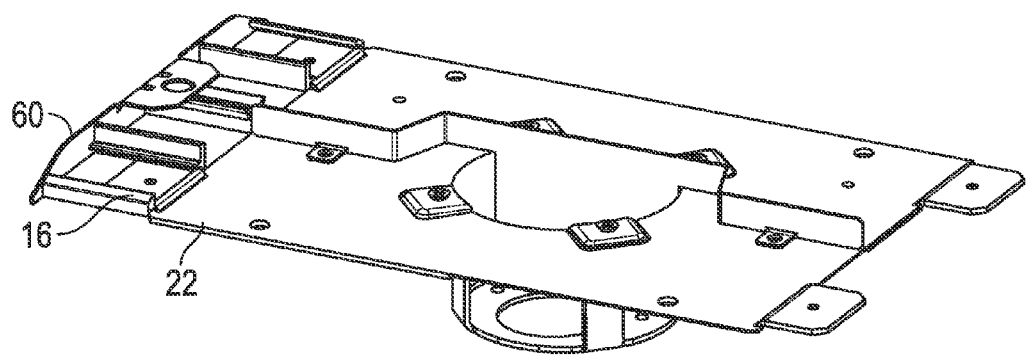
FIG. 23 is a front perspective view of a portion of the poke-thru floor fitting system of FIG. 7.
Figure 24:
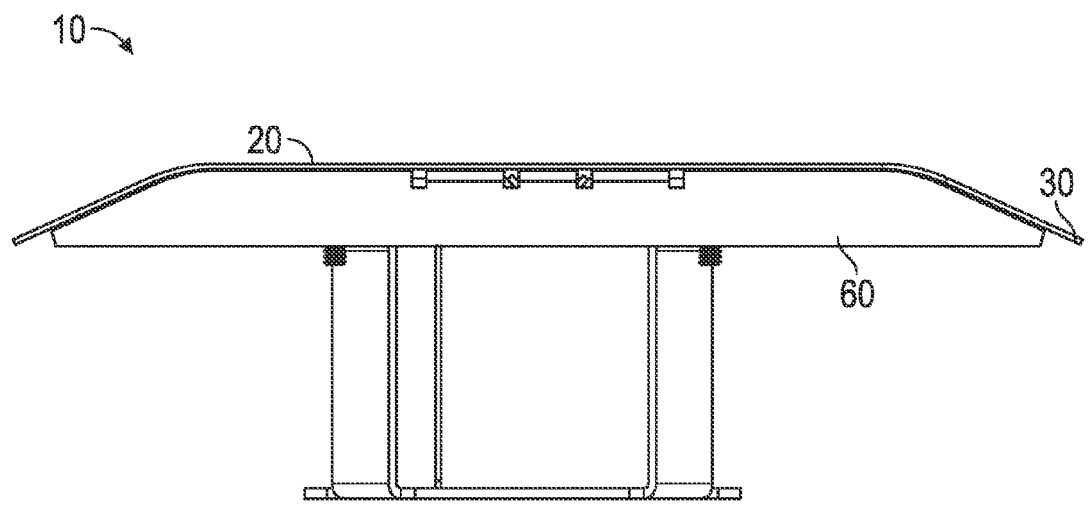
FIG. 24 is a side perspective view of the poke-thru floor fitting system of FIG. 7.

Referring back to FIGS. 5-8 and to FIGS. 12-13, the base 22 includes a planar upper portion 34, a poke-thru interface portion 36 and raceway interface tabs 37. The planar upper portion 34 includes a substantially flat bottom surface 38 that is adapted to rest on the upper surface 18 of the floor structure 14. An opening 40 is formed through the planar upper portion 34 and may have a size and shape that corresponds to the size and shape of the opening in the floor structure 14 accommodating the poke-thru device 12. For example, the opening 40 may be a substantially circular 3-inch or 4-inch diameter opening for use with standard 3-inch or 4-inch diameter poke-thru devices, respectively. The planar upper portion 34 may also include one or more holes 41 to facilitate connection of the base 22 to the floor structure 14.

The poke-thru interface portion 36 is attached to the planar upper portion 34 and extends outward from the bottom surface 38 to a mounting bracket 42. In some embodiments, the poke-thru interface portion 36 and the planar upper portion 34 may be formed as a single element, while in other embodiments, the poke-thru interface portion 36 may be attached to the planar upper portion 34 by screws or the like. The poke-thru interface portion 36 is adapted to be accommodated in the opening in the floor structure 14 accommodating the poke-thru device 12 to allow the mounting bracket 42 to contact the poke-thru device 12. In some embodiments, mounting bracket 42 may be adapted to be fastened to the poke-thru device 12, for example, with screws or the like. The mounting bracket 42 may include one or more openings 44 allowing the electrical and/or data/telecommunication cables (not shown) to pass from the poke-thru device 12 into the interface portion 36 and, thus, the poke-thru floor fitting system 10.

The raceway interface tabs 37 are formed at opposing ends of the planar upper portion 34 and facilitate connection of raceways 16 to the base 22. Thus, the raceway interface tabs 37 allow two raceways 16 to be connected to the base 22 and to route electrical and/or data/telecommunication cables (not shown) therefrom in two opposing directions.

Referring back to FIGS. 5-6 and 14-17, the poke-thru floor fitting system 10 may include a divider 46 that is attachable to an upper surface 48 of the base 22 at attachment locations 50 so that the divider 46 is disposed between the base 22 and the cover 20 to provide two separate channels 51 within the poke-thru floor fitting system 10 extending from the first end 30 of the cover 20 to the second end 31 of the cover 20. Thus, the divider 46 may separate electrical cabling from data/telecommunication cabling within the poke-thru floor fitting system 10 as the wiring transitions from the poke-thru device 12 to the raceway 16. In some embodiments, the divider 46 may be attachable at multiple attachment locations 50 so that the position of the divider may be altered to accommodate more or less electrical cabling or data/telecommunication cabling, as a particular installation may require. Thus, for raceways 16 that include multiple channels, the positioning of the divider 46 may be changed to alter the allocation of said channels to either electrical cabling or data/telecommunication cabling. The poke-thru floor fitting system 10 may also include an insert 52 that is adapted to sit on the mounting bracket 42 within the poke-thru interface portion 36 to separate the electrical cabling from the data/telecommunication cabling within the poke-thru interface portion 36. Thus, the insert 52 and the divider 46 substantially maintain separation of the electrical cabling from the data/telecommunication cabling as the cabling passes through the entirety of the poke-thru floor fitting system 10.

Referring back to FIGS. 7-8 and 18-20, the poke-thru floor fitting system 10 may include a divider 54 that is attachable to the upper surface 48 of the base 22 at attachment locations 50 so that a first portion 56 of the divider 54 is disposed between the base 22 and the cover 20 to provide two separate channels 51 within the poke-thru floor fitting system 10 extending from the first end 30 of the cover 20 to the second end 31 of the cover 20. The divider 54 may include a second portion 58 that is adapted to extend downward into the poke-thru interface portion 36 to separate the electrical cabling from the data/telecommunication cabling within the poke-thru interface portion 36. Thus, the divider 54 may separate electrical cabling from data/telecommunication cabling within the poke-thru floor fitting system 10 as the wiring transitions from the poke-thru device 12 to the raceway 16. In some embodiments, the divider 54 may be attachable at multiple attachment locations 50 so that the position of the divider may be altered to accommodate more or less electrical cabling or data/telecommunication cabling, as a particular installation may require. Thus, for raceways 16 that include multiple channels, the positioning of the divider 54 may be changed to alter the allocation of said channels to either electrical cabling or data/telecommunication cabling.

Referring to FIGS. 5-8 and 21-24, in some embodiments, it may be desirable to route the wiring from the poke-thru device 12 to a single raceway 16 in a single direction. Therefore, in some embodiments, the poke-thru floor fitting system 10 may include an end cap 60 closing channels 51, shown in FIGS. 17 and 20, of the poke-thru floor fitting system 10 at the first end 30. In some embodiments, the end cap 60 may attach to a small length of raceway 16 disposed between the base 22 and the end cap 60, while in other embodiments, the end cap 60 may attach directly to the base 22 and/or cover 20 of the poke-thru floor fitting system 10. Thus, the poke-thru floor fitting system 10 may advantageously provide for routing of cabling in a single direction or in multiple directions along the upper surface 18 of the floor structure 14.

The poke-thru floor fitting system 10 advantageously provides a system for transitioning electrical and/or data/telecommunication cables from poke-thru devices 12 to one or more cable raceways 16 that is substantially the same height as the cable raceway 16, itself. Thus, the poke-thru floor fitting system 10 has the same low profile as the cable raceway 16 to which it is connected and, therefore, does not increase the tripping hazard associated with the cable raceway 16 and cable/wiring distribution system. Accordingly, rather than requiring poke-thru devices 12 to be located under tables, desks or the like, the poke-thru floor fitting system 10 allows for power and/or data distribution through raceways 16 from poke-thru devices 12 that are located at essentially any position in a room without increasing tripping hazards.

The poke-thru floor fitting system 10 also advantageously allows for the electrical and/or data/telecommunication cables to be fed directly therethrough from the poke-thru device 12 to one or more cable raceways 16 without requiring termination of the wiring. Additionally, the dividers 46 and 54 allow the poke-thru floor fitting system 10 to change the allocation of raceway channels dedicated to electrical and/or data/telecommunication cables.

Although this invention has been shown and described with respect to the detailed embodiments thereof, it will be understood by those skilled in the art that various changes in form and detail thereof may be made without departing from the spirit and the scope of the invention.

What is claimed is:

1. A system comprising:
   a poke-thru interface bracket for mounting a poke-thru device allowing cable to pass through a floor structure;
   a base adapted to be disposed on an upper surface of the floor structure, the base having an opening for communicating with the poke-thru interface bracket;
   a cover interfacing with the base to form a longitudinal passage; and
   a cable raceway interfacing with the base and the cover;
   wherein the opening in the base allows cable to pass from the poke-thru interface bracket to the longitudinal passage; and
   wherein the cover is formed to be substantially the same shape as an upper surface of the cable raceway.

2. The system of claim 1, wherein the cover comprises:
   a flat top portion; and
   two angled side portions on opposite sides of the flat top portion, the angled side portions angled downward from the flat top portion toward the base.

3. The system of claim 1, further comprising an end cap adapted to interface with the cover and base to close an end of the longitudinal passage.

4. A poke-thru floor fitting system for transitioning cables comprising:
   a poke-thru interface bracket for mounting a poke-thru device configured to allow cable to pass through a floor structure;
   a base adapted to be disposed on an upper surface of the floor structure, the base having an opening adapted to communicate with the poke-thru interface bracket;
   a cover interfacing with the base to form a longitudinal passage, wherein a first opening into the longitudinal passage is formed at the first end of the cover and a second opening into the longitudinal passage is formed at the second end of the cover;
   at least one divider dividing the longitudinal passage into at least a first channel and a second channel; and
   an end cap adapted to interface with the cover and base to close one of the first opening or the second opening;
   wherein the other of the first opening and the second opening is not closed with an end cap.

5. The poke-thru floor fitting system for transitioning cables of claim 4, wherein the cover is formed to be substantially the same shape as an upper surface of a cable raceway.

6. The poke-thru floor fitting system for transitioning cables of claim 4, wherein the cover comprises:
   a flat top portion; and
   two angled side portions on opposite sides of the flat top portion, the angled side portions angled downward from the flat top portion toward the base;
   wherein the flat top portion and the angled side portions extend from a first end to a second end of the cover.

7. The poke-thru floor fitting system for transitioning cables of claim 4, wherein the first channel and the second channel extend from the first end of the cover to the second end of the cover.

8. The poke-thru floor fitting system for transitioning cables of claim 4, wherein the first channel is configured to route a first type of cable and the second channel is configured to route a second type of cable that is different than the first type of cable.

9. The poke-thru floor fitting system for transitioning cables of claim 4, wherein the divider attaches to the base; and
   wherein the base includes a plurality of attachment locations for the divider so that the divider may adjust the size of the first channel and the second channel.

10. The poke-thru floor fitting system for transitioning cables of claim 4, further comprising an insert that fits within the poke-thru interface bracket to divide the poke-thru interface bracket into a first poke-thru channel and a second poke-thru channel.

11. The poke-thru floor fitting system for transitioning cables of claim 10, wherein the first poke-thru channel is in communication with one of the first channel and second channel of the longitudinal passage and the second poke-thru channel is in communication with the other of the first channel and second channel of the longitudinal passage.

12. A poke-thru floor fitting system comprising:
   a poke-thru interface bracket for mounting a poke-thru device configured to allow cable to pass through a floor structure;
   a base adapted to be disposed on an upper surface of the floor structure and having an opening that communicates with the poke-thru interface bracket;
   a cover adapted to interface with the base to form a longitudinal passage; and
   a divider separating the longitudinal passage into at least first and second separate channels,
   wherein the divider attaches to the base; and
   wherein the base includes a plurality of lateral attachment locations for the divider so that the divider may adjust the size of the first and second separate channels.

13. The poke-thru floor fitting system of claim 12, wherein the cover is formed to be substantially the same shape as an upper surface of a first cable raceway and comprises:
   a flat top portion; and
   two angled side portions angled downward from the flat top portion toward the base portion.

14. The poke-thru floor fitting system of claim 12, further comprising an end cap that interfaces with the cover and base to close an end of the longitudinal passage.

15. The poke-thru floor fitting system of claim 12, wherein the divider comprises:
   a first portion disposed in the longitudinal passage between the base and the cover; and
   a second portion extending downward from the first portion into the poke-thru interface bracket.

16. The poke-thru floor fitting system of claim 15, wherein the second portion of the divider divides the poke-thru interface bracket into first and second poke-thru channels, the first and second poke-thru channels being in communication with the first and second separate channels of the longitudinal passage, respectively.

17. The poke-thru floor fitting system of claim 16, wherein the first separate channel is configured to route electrical cable; and
   wherein the second separate channel is configured to route telecommunications cable.

* * * * *